(No Model.)
F. B. BADT.
MULTIPLE SERIES SYSTEM OF ELECTRICAL DISTRIBUTION.
No. 579,556.  Patented Mar. 30, 1897.
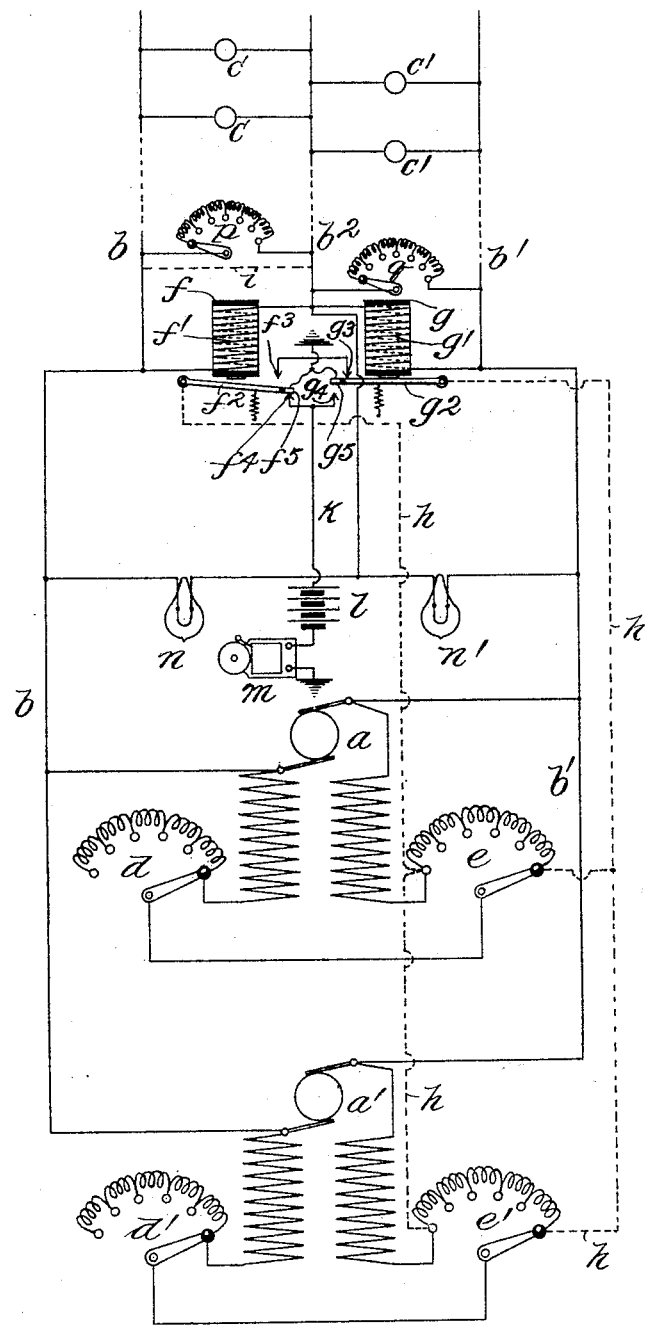
Witnesses:
D. W. C. Tanner.
George L. Cragg.
Inventor,
Francis B. Badt,
By Burton & Brown
Attorneys.

UNITED STATES PATENT OFFICE.

FRANCIS B. BADT, OF CHICAGO, ILLINOIS.

MULTIPLE-SERIES SYSTEM OF ELECTRICAL DISTRIBUTION.

SPECIFICATION forming part of Letters Patent No. 579,556, dated March 30, 1897.

Application filed January 25, 1897. Serial No. 620,643. (No model.)

*To all whom it may concern:*

Be it known that I, FRANCIS B. BADT, a citizen of the United States, residing at Chicago, in the county of Cook and State of Illinois, have invented new and useful Improvements in Multiple-Series Systems of Electrical Distribution, of which the following is a specification.

My invention relates to mutiple-series systems of distribution of electricity; and its object is to provide means for effecting a prompt adjustment of the electromotive force of the generator upon a variation in potential between a compensating and a main conductor, as, for instance, such a variation as is occasioned by the short-circuiting of a branch of the multiple-series system.

By means of my invention the translating devices remaining in circuit with the generator are protected against abnormal current which would cause their injury or destruction when a short circuit occurs between a compensating conductor and a main conductor.

Systems of multiple-series distribution may be divided into two general classes, namely, those in which both the main and the compensating conductors extend from a divided source of electricity, and those in which the main or distributing conductors only extend from the source of electricity which is not divided, but in which the compensating conductor does not return to the source of energy. In systems of this latter class compensating devices are associated with the main and compensating conductors to maintain a balance between the branches of the system. Dynamos or resistances may be used for compensating devices to preserve a balance of the potential between the compensating and main conductors when a distortion of the load occurs. My Patents No. 557,099, dated March 31, 1896, and No. 558,924, dated April 28, 1896, are examples of the latter class of multiple-series systems of distribution in which the compensating conductor does not return to the source of energy. It is to this latter class of multiple-series systems of distribution that my invention is peculiarly applicable; and it consists in the provision of an automatically-operative means or device for promptly reducing the electromotive force of the main generator upon a variation in potential between a main and a compensating conductor, as upon the sudden removal of a branch of the system from circuit with the generator.

One embodiment of my invention may be described as consisting in providing electromagnetic means or relay mechanism comprising, in a multiple-series system, two electromagnets in the case of a three-wire system, connected one in each branch between the compensating conductor and the mains with resistance in the field-circuit of the generator, which resistance is normally shunted by means of the aforesaid electromagnetic relay mechanism. If either of said magnets should become deënergized, as upon the establishment of an accidental short circuit between a compensating and a main conductor, the shunt controlled by the magnets would be broken and the resistance would be cut into the field-circuit, thereby reducing the electromotive force of the generator at once. The resistance is preferably adjusted so as to reduced the electromotive force upon a three-wire system one-half.

I will explain my invention more particularly by reference to the accompanying drawing, which illustrates my invention as being applied to a three-wire system.

Two generators $a$ $a'$ are shown connected between the main conductors $b$ and $b'$, which extend to the district to be supplied with current. Between the main conductors $b$ $b'$ and a neutral conductor $b^2$ two groups of translating devices $c$ $c$ and $c'$ $c'$ are connected. The generators are illustrated as being of the shunt-wound type, in the field-circuits whereof are included the usual field-rheostats $d$ $d'$ and adjustable resistances $e$ $e'$, these latter resistances being provided for reducing the electromotive force, as will be hereinafter specified. The coil $f'$ of a relay $f$ is connected between the main conductor $b$ and the neutral compensating conductor $b^2$, while the coil $g'$ of the relay $g$ is connected between said compensating conductor and main $b'$. The relays $f$ and $g$ are provided with armatures $f^2$ $g^2$, having normal contacts $f^3$ $g^3$, united by a conductor, and alternate contacts $f^4$ $g^4$, likewise electrically united. The armatures carry insulated contact portions $f^5 g^5$, which are grounded. When the armatures are drawn against their normal contacts $f^3 g^3$, a shunt-circuit $h\ h$, having its terminals in said armatures, is completed about the resistances $e\ e'$.

When the translating devices are actively in circuit with the generator, the relays $f$ and $g$ are energized and the shunt-circuit $h\ h$ thereby completed about the resistances $e\ e'$. If now an accidental shunt of low resistance or short circuit, as $i$, be established between a main conductor, as $b$, and the compensating conductor, the magnet $f$ will be deënergized and the shunt $h\ h$, jointly controlled by relays $f$ and $g$, broken, thereby throwing the resistances $e\ e'$ into circuit with the fields of generators $a\ a'$, whereby the electromotive force is reduced to the capacity of the translating devices in the remaining active branch of the system. To convey an indication of the abnormal condition of the injured branch of the distributing system, I extend a conductor $k$ from the alternate contacts $f^4 g^4$ to a battery $l$ and grounded bell $m$, the circuit through said bell being closed when either armature $f^2 g^2$ is released by way of either alternate contact and a grounded portion $f^5$ or $g^5$. It is desirable to also indicate the side of the system that has been injured, for which purpose I connect pilot-lamps $n\ n'$, between the mains $b\ b'$, respectively, and the compensating conductor. These pilot-lamps are illuminated during the normal operation of the system, but illumination of the pilot-lamp corresponding to a branch that is short-circuited ceases.

I have illustrated diagrammatically two compensating devices $p\ q$ in the form of manually-controlled rheostats for maintaining a balance between the branches of the system.

As to the state of the art, reference is had to my Patent No. 487,816, issued December 13, 1892.

In starting the system of my invention it is desirable to cut out the resistances $e\ e'$ until the electromotive force has been brought up to the required value, whereupon said resistances are cut in. The shunt $h\ h$ having been completed by magnets $f\ g$, however, these resistances have no effect during the continuance of the shunt. The resistances $e\ e'$ in the form of my invention herein described are preferably so adjusted as to reduce the electromotive force about one-half.

It is obvious that many means may be employed for practicing my invention and that my invention is applicable to multiple-series systems of electrical distribution having more than three wires.

The generators employed may be of any other well-known type than that illustrated. The extraneous resistances $e\ e'$ may be associated with the generators or the working circuit in a manner other than that set forth. The electromotive force of the generator may be reduced in accordance with my invention by the use of other means than extraneous resistance.

In other respects I have omitted the description of details and the enumeration of many modifications which may be made without departing from the spirit of my invention.

Having, however, fully set forth one manner of practicing my invention and the construction of one type of apparatus for effecting the operation of my improved system, I claim and desire to secure by these Letters Patent, together with all such modifications as may be made by mere skill and with only the limitations expressed or by law implied in view of the state of the related arts, the following:

1. In a system of multiple-series distribution, the combination with main and compensating conductors, of an undivided source of electricity from which the main conductors are led, and means adapted to respond automatically upon a variation in potential between a compensating and a main conductor to reduce the electromotive force of the generator, substantially as described.

2. In a system of multiple-series distribution, the combination with main and compensating conductors, of a generator from which the main conductors only are led, and means adapted to respond automatically upon the establishment of a short circuit between a main and a compensating conductor to reduce the electromotive force of the generator, substantially as described.

3. In a system of multiple-series distribution, the combination with main and compensating conductors, of a generator from which the main conductors only are led, and electromagnetic means adapted to respond upon a variation in potential between a compensating and a main conductor to reduce the electromotive force of the generator, substantially as described.

4. In a system of multiple-series distribution, the combination with main and compensating conductors, of a generator from which the main conductors only are led, and electromagnetic means adapted to respond upon the establishment of a short circuit between a main and a compensating conductor to reduce the electromotive force of the generator.

5. In a system of multiple-series distribution, the combination with main and compensating conductors, of a generator from which the main conductors only are led, a resistance for reducing the electromotive force of the generator, and means for including said resistance in circuit with the generator, said means being adapted to respond upon a variation in potential between a compensating and a main conductor to include said resistance in circuit with the generator, substantially as described.

6. In a system of multiple-series distribution, the combination with main and compensating conductors, of a generator from which the main conductors only are led, a resistance for reducing the electromotive force of the generator, and means for including said resistance in circuit with the generator, said means being adapted to respond upon the establishment of a short circuit between a main and a compensating conductor to include said resistance in circuit with the generator, substantially as described.

7. In a system of multiple-series distribution, the combination with main and compensating conductors, of a generator from which the main conductors only are led, a resistance for reducing the electromotive force of the generator, and relay mechanism for including said resistance in circuit with the generator, said relay mechanism being adapted to be actuated upon a variation in potential between a compensating and a main conductor to include said resistance in circuit with the generator, substantially as described.

8. In a system of multiple-series distribution, the combination with main and compensating conductors, of a generator from which the distributing-conductors are led, a resistance for reducing the electromotive force of the generator, a shunt about said resistance to normally remove it from circuit with the generator, and means for breaking said shunt, said means being adapted to respond upon a variation in potential between the compensating and a distributing conductor to break the shunt, substantially as described.

9. In a system of multiple-series distribution, the combination with main and compensating conductors, of a generator from which the main conductors are led, a resistance for reducing the electromotive force of the generator, a shunt about said resistance to normally remove it from circuit with the generator, and means for breaking said shunt, said means being adapted to respond to a short circuit between a main and a compensating conductor to break the shunt, substantially as described.

10. In a system of multiple-series distribution, the combination with main and compensating conductors, of a generator from which the main conductors are led, a resistance for reducing the electromotive force of the generator, a shunt about said resistance to normally remove it from circuit with the generator, and electromagnetic means for breaking said shunt, said electromagnetic means being adapted to respond upon a variation in potential between the compensating and a main conductor to break the shunt, substantially as described.

11. In a system of multiple-series distribution, the combination with main and compensating conductors, of a generator from which the main conductors are led, a resistance for reducing the electromotive force of the generator, a shunt about said resistance, relay mechanism comprising electromagnets connected in series multiple with the main and compensating conductors adapted to break said shunt, said relay mechanism being adapted to respond to a short circuit between a main and the compensating conductor to break the shunt, substantially as described.

12. In a multiple-series system of electrical distribution, the combination with main and compensating conductors, of a generator from which the main conductors only are led, means for reducing the electromotive force of the generator, a shunt-circuit governing said means, and electromagnetic means for controlling said shunt-circuit adapted to respond upon the establishment of a short circuit between a main and compensating conductor to alter the condition of said shunt-circuit to reduce the electromotive force of the generator, substantially as described.

In testimony whereof I affix my signature in the presence of two witnesses.

FRANCIS B. BADT.

Witnesses:
GEORGE L. CRAGG,
JOHN W. SINCLAIR.